March 15, 1932. D. P. DAVIES 1,849,284
TRACTOR
Original Filed Feb. 3, 1930
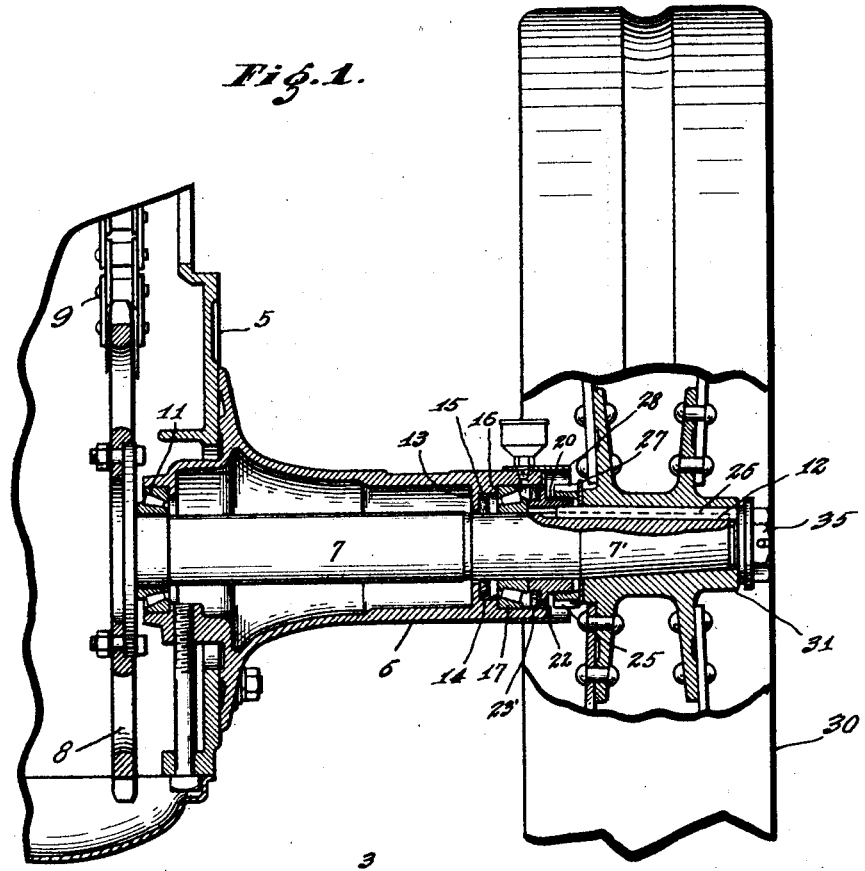
Inventor
DAVID P. DAVIES,
By James A Walsh
Attorney Patented Mar. 15, 1932

1,849,284

UNITED STATES PATENT OFFICE

DAVID P. DAVIES, OF RACINE, WISCONSIN, ASSIGNOR TO J. I. CASE COMPANY, OF RACINE, WISCONSIN, A CORPORATION

TRACTOR

Application filed February 3, 1930, Serial No. 425,370. Renewed December 14, 1931.

As is well known, tractors employed for field, road and other work are subjected to rough usage, and consequently great strain is imparted to the rear axle, driving wheels and bearings associated therewith, so that difficulty is experienced in providing axles, bearings and assemblages which will stand up in service and have the degree of durability desired.

The necessary accuracies of adjustment and nicety of fit of bearings have been commonly accomplished by the use of comparatively delicate or insecure means, and the strength of the axles and other parts associated therewith has also been commonly impaired by the mechanical construction of means for maintaining such bearings in their true relationships. It has been the practice to cut into or alter the shape of axles for this purpose at a point between the wheel-hub and the frame of the tractor, for the purpose of maintaining bearing alinement and position, but in so doing the strength of the axle is materially decreased at a point where it is subjected to its maximum stress. To relieve or obviate this situation and provide axles of sufficient strength it becomes necessary, at increased cost, to make the axles and bearings larger in the type of construction referred to.

My object, therefore, is to improve the drive-wheel mounting and rear axle and bearing construction for tractors in a manner which will insure and constantly maintain the axle and bearings and wheels in accurate assembly relationship, at the same time providing readily adjustable means of a highly durable character, not subject to breakage or change in service, for taking up normal wear of the bearings. And it will be understood that the necessary pressure for maintaining the bearings in proper adjustment is furnished by the wheel-hub, and by this hub transmitted to the axle, thus avoiding any mutilation of the axle or impairment of its strength at the point where it is subjected to the greatest stress.

In the accompanying drawings, forming part hereof, Figure 1 is a fragmentary plan, partially in detail, of that portion of a tractor to which my improvement is applicable; Fig. 2, an enlarged detail of part of Fig. 1; and Fig. 3 is a detail sectional view of parts of the mounting, as indicated by the dotted lines 3—3 in Fig. 2.

In the drawings, the numeral 5 indicates the tractor body, 6 the axle housing, and 7 the axle positioned therein, the inner end of the axle in the specific type of tractor indicated being provided with a sprocket 8 connected by a chain 9 to transmission mechanism, in a well known manner, and constituting a chain final drive tractor, but it will be understood that my improvement is applicable to tractors generally provided with any selected types of final drive. The axle 7 at its inner end is mounted in the housing 6 by the taper roller bearings 11, and projects at its opposite end through the housing in preferably tapered formation, as at 7', said outer portions embodying a key-way 12, the housing having an internal flange 13 between which and a cup 14 packing 15 of any desired character may be retained. The housing is further provided with an internal shoulder 16 against which are fitted the taper roller bearings 17. In assembling the axle and housing I employ an exteriorly threaded sleeve 20 embodying a key-way 21 adapted to aline longitudinally with key-way 12 in the axle portion 7', and which sleeve preferably embodies a flange 22 which serves, in connection with a cup 23 or similar device, as retainer for a packing ring 23'. An adjusting nut 25 which thrusts against the inside shoulder of wheel-hub 31, is threaded onto the sleeve 20 which as it is turned urges the latter inwardly toward and thrusts the same against the bearing 17, and to further connect these parts I provide a key 26 which is inserted in the key-ways 12 and 21, which key rigidly connects the sleeve and axle at all times. When the parts described have been so assembled they are maintained in such relation by a keeper 27, provided with a notch or key-way, to receive the key 26, and which keeper may be bent over on the nut 25 for locking the same in immovable position. The sleeve and adjusting parts may be protected by a dust-cap 28 of any desired character and arrangement. The wheel 30, embodying a suitable hub 31, is then thrust home onto the end of the axle 7', and is non-rotatably secured thereon by the key 26 positioned in the key-way 12 of the axle and a similar key-way 12' in the hub, the hub being further secured to the axle by a nut 35. The wheel having been placed in position, the nut 25 is then tightened, which action urges the sleeve 20 inwardly against the bearing 17, in which manner the parts are accurately adjusted, and by which tightening action of the nut any looseness which might have developed in the assemblage of the parts described will be taken up, so that in the manner stated I provide a positively fixed accurate fitting between the hub, axle and bearing, and as the key 26 retains the hub, axle, sleeve and the nut 25 in fixed relation said parts become a unitary structure rotatable together as said axle is driven. It will be further understood that when it may be considered timely to determine if the assembled parts may need adjustment this can be readily accomplished by tightening the nut 25 if required. In the manner described it will be seen that by my improvement it is unnecessary to thread or alter the axle between the wheel-hub and the tractor frame to effect the adjustment of the bearing, and that the adjustment of the bearings is accomplished in substantially the manner as if a threaded axle were employed, and while I have shown the improvement as applied to a tapered axle I desire it to be understood that a straight axle may be employed in connection with a key or its equivalent for preventing rotation of the sleeve, keeper and the wheel hub, as hereinbefore indicated.

I claim as my invention:

1. The combination of a housing, an axle therein embodying a key-way, a roller bearing between the housing and axle, a sleeve abutting the bearing said sleeve having an integral key-way therein alining with the axle key-way, a wheel-hub having a key-way therein adapted to be alined with the key-way in said sleeve, a nut threaded on the sleeve for thrusting the latter against the bearing, said nut abutting against said hub, and a key in said key-way for fixedly connecting the axle, sleeve and hub to rotate said parts as a unit.

2. The combination of a housing, an axle therein, a wheel-hub on the axle, an anti-friction bearing between the housing and axle, a sleeve abutting said bearing, a nut on the sleeve and abutting the hub for thrusting the sleeve inwardly against the bearing, means between the hub, axle and sleeve for securing them as a rotatable unit, and means for securing the outer end of the axle to the hub.

3. The combination of a housing, an axle therein, an anti-friction bearing between the housing and axle, a flanged sleeve on the axle, a wheel-hub on the axle, an adjusting nut on the sleeve bearing against the wheel-hub, a nut-lock on the axle between the nut and hub, and a nut on the end of the axle for securing the hub to the axle.

4. The combination of a housing, an axle therein, a wheel-hub on the axle, an anti-friction bearing between the housing and axle, means embodying a key-way adapted to urge the bearing against the housing, means abutting against the wheel-hub for actuating said first mentioned means, a keeper embodying a key-way positioned between the hub and actuating means, for locking said latter means, and means for locking the hub, axle and associated parts to rotate as a unit.

5. The combination of a housing having an internal flange, an axle in the housing, packing means encircling the axle and engaging the flange, an anti-friction bearing in the housing, a sleeve on the axle having an external flange, packing means retained between said flange and the anti-friction bearing, a hub on the axle, a nut on the sleeve for forcing the latter against the bearing said nut abutting against the hub, and a key between the hub and axle and extending into the sleeve for engaging said parts in unitary rotatable relation.

6. The combination, with a tractor, of a housing, an axle in the housing, an anti-friction bearing between the housing and axle, a wheel-hub on the axle, a sleeve abutting the bearing, a nut on the sleeve for thrusting the latter against the bearing, said nut abutting against the hub, a removable key between the hub, axle and sleeve for locking said parts to rotate as a unit, and means on the axle for securing the hub thereto.

7. The combination, with a tractor, a housing, a bearing in the housing, an axle mounted in the bearing, a wheel-hub on the axle, means for exerting pressure against the bearing to maintain the latter and the axle in accurate fixed relation, means engaging the wheel-hub for adjusting said pressure exerting means, and means engaging the pressure exerting means, hub and axle for securing said elements in unitary rotatable relation.

8. The combination, with a tractor, of a housing, a bearing in the housing, an axle mounted in the bearing, a wheel-hub on the axle, means between the housing and the axle for exerting pressure against the bearing to maintain the latter and the axle in accurate fixed relation, means engaging the wheel-hub for adjusting the pressure exerting means, and means extending longitudinally through a portion of the axle and engaging the pressure exerting means and the hub for securing said pressure means, hub and axle to rotate as a unit.

In testimony whereof I affix my signature.

DAVID P. DAVIES.